US011829590B2

United States Patent
Bates et al.

(10) Patent No.: US 11,829,590 B2
(45) Date of Patent: Nov. 28, 2023

(54) MULTI-HOUSEHOLD SUPPORT

(71) Applicant: Sonos, Inc., Santa Barbara, CA (US)

(72) Inventors: Paul Bates, Santa Barbara, CA (US);
Joni Rafalski Hoadley, Santa Barbara, CA (US); Lee Keyser-Allen, Medford, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 18/052,662

(22) Filed: Nov. 4, 2022

(65) Prior Publication Data

US 2023/0266866 A1  Aug. 24, 2023

Related U.S. Application Data

(63) Continuation of application No. 17/222,393, filed on Apr. 5, 2021, now Pat. No. 11,494,060, which is a
(Continued)

(51) Int. Cl.
*G06F 3/0484* (2022.01)
*H04L 12/28* (2006.01)
(Continued)

(52) U.S. Cl.
CPC ........ *G06F 3/0484* (2013.01); *H04L 12/2809* (2013.01); *H04L 67/125* (2013.01);
(Continued)

(58) Field of Classification Search
CPC ... H04L 67/52; H04L 12/2809; H04L 67/125; H04L 67/51; H04L 67/34; H04L 2012/2849
See application file for complete search history.

(56) References Cited

U.S. PATENT DOCUMENTS 5,440,644 A   8/1995   Farinelli et al.
5,598,278 A   1/1997   Tanaka et al.
(Continued)

FOREIGN PATENT DOCUMENTS

CA   2861792 A1   7/2013
CN   102550039 A   7/2012
(Continued)

OTHER PUBLICATIONS

Advisory Action dated Aug. 25, 2016, issued in connection with U.S. Appl. No. 14/039,615, filed Sep. 27, 2013, 5 pages.
(Continued)

*Primary Examiner* — Tadesse Hailu
(74) *Attorney, Agent, or Firm* — FORTEM IP LLP; Benjamin M Urban

(57) ABSTRACT

Embodiments are provided for enabling a user to control multiple media playback systems with a single mobile device. The mobile device may connect with a first or second media playback system based on receiving a first or second household identifier (HHID), respectively. If the mobile device receives both the first and second HHIDs, the mobile device may connect with either the first or second media playback system based on a priority of the two systems. If neither the first nor second HHIDs are received by the mobile device, a user may be prompted to add a third media playback system if the mobile device receives a third HHID. The user interface of the mobile device may receive an input to connect the mobile device to the third media playback system, and a connection may be established between the mobile device and the third media playback system.

20 Claims, 12 Drawing Sheets

Related U.S. Application Data continuation of application No. 15/942,818, filed on Apr. 2, 2018, now Pat. No. 10,969,940, which is a continuation of application No. 14/039,615, filed on Sep. 27, 2013, now Pat. No. 9,933,920.

(51) Int. Cl.
*H04L 67/51* (2022.01)
*H04L 67/52* (2022.01)
*H04L 67/125* (2022.01)
*H04L 67/00* (2022.01)

(52) U.S. Cl.
CPC .............. *H04L 67/52* (2022.05); *H04L 67/34* (2013.01); *H04L 67/51* (2022.05); *H04L 2012/2849* (2013.01)

(56) References Cited

U.S. PATENT DOCUMENTS

| | | | |
|---|---|---|---|
| 5,636,345 A | 6/1997 | Valdevit | |
| 5,761,320 A | 6/1998 | Farinelli et al. | |
| 5,923,902 A | 7/1999 | Inagaki | |
| 6,032,202 A | 2/2000 | Lea et al. | |
| 6,256,554 B1 | 7/2001 | DiLorenzo | |
| 6,349,352 B1 | 2/2002 | Lea | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,587,127 B1 | 7/2003 | Leeke et al. | |
| 6,611,537 B2 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 6,985,694 B1 | 1/2006 | De Bonet et al. | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,218,930 B2 | 5/2007 | Ko et al. | |
| 7,236,739 B2 | 6/2007 | Chang | |
| 7,236,773 B2 | 6/2007 | Thomas | |
| 7,251,533 B2 | 7/2007 | Yoon et al. | |
| 7,263,070 B1 | 8/2007 | Delker et al. | |
| 7,295,548 B2 | 11/2007 | Blank et al. | |
| 7,312,785 B2 | 12/2007 | Tsuk et al. | |
| 7,356,011 B1 | 4/2008 | Waters et al. | |
| 7,383,036 B2 | 6/2008 | Kang et al. | |
| 7,394,480 B2 | 7/2008 | Song | |
| 7,433,324 B2 | 10/2008 | Switzer et al. | |
| 7,469,139 B2 | 12/2008 | Van de Groenendaal | |
| 7,483,538 B2 | 1/2009 | McCarty et al. | |
| 7,571,014 B1 | 8/2009 | Lambourne et al. | |
| 7,607,091 B2 | 10/2009 | Song et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,742,740 B2 | 6/2010 | Goldberg et al. | |
| 7,835,689 B2 | 11/2010 | Goldberg et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington | |
| 8,249,071 B2 | 8/2012 | Kreifeldt et al. | |
| 8,280,076 B2 | 10/2012 | Devantier et al. | |
| 8,290,603 B1 | 10/2012 | Lambourne | |
| 8,326,951 B1 | 12/2012 | Millington et al. | |
| 8,483,853 B1 | 7/2013 | Lambourne | |
| 8,831,761 B2 | 9/2014 | Kemp et al. | |
| 8,868,698 B2 | 10/2014 | Millington et al. | |
| 8,903,526 B2 | 12/2014 | Beckhardt et al. | |
| 9,456,279 B1 | 9/2016 | Murdoch | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0157951 A1 | 8/2003 | Hasty, Jr. | |
| 2004/0024478 A1 | 2/2004 | Hans et al. | |
| 2004/0168081 A1 | 8/2004 | Ladas et al. | |
| 2005/0170781 A1 | 8/2005 | Jacobsen et al. | |
| 2005/0235338 A1 | 10/2005 | Abiezzi et al. | |
| 2005/0239445 A1 | 10/2005 | Karaoguz et al. | |
| 2005/0282589 A1 | 12/2005 | Barneah | |
| 2006/0013197 A1 | 1/2006 | Anderson | |
| 2006/0142034 A1 | 6/2006 | Wentink et al. | |
| 2006/0149850 A1 | 7/2006 | Bowman | |
| 2006/0173976 A1 | 8/2006 | Mncent et al. | |
| 2006/0195480 A1 | 8/2006 | Spiegelman et al. | |
| 2007/0022207 A1 | 1/2007 | Millington | |
| 2007/0142944 A1 | 6/2007 | Goldberg et al. | |
| 2008/0005676 A1 | 1/2008 | Evans et al. | |
| 2008/0052371 A1 | 2/2008 | Partovi et al. | |
| 2008/0133715 A1 | 6/2008 | Yoneda et al. | |
| 2008/0177822 A1 | 7/2008 | Yoneda | |
| 2009/0062939 A1 | 3/2009 | Park | |
| 2010/0317332 A1 | 12/2010 | Bathiche et al. | |
| 2011/0087842 A1 | 4/2011 | Lu et al. | |
| 2011/0223899 A1 | 9/2011 | Hiraide | |
| 2011/0268286 A1 | 11/2011 | Sanchez et al. | |
| 2012/0146918 A1 | 6/2012 | Kreiner et al. | |
| 2012/0154108 A1 | 6/2012 | Sugaya | |
| 2012/0263318 A1* | 10/2012 | Millington | G06F 3/165 381/107 |
| 2013/0014232 A1 | 1/2013 | Louboutin et al. | |
| 2013/0017363 A1 | 1/2013 | Morioka et al. | |
| 2013/0024018 A1 | 1/2013 | Chang et al. | |
| 2013/0076651 A1* | 3/2013 | Reimann | G06F 3/0488 345/173 |
| 2013/0170363 A1 | 7/2013 | Millington et al. | |
| 2013/0173794 A1 | 7/2013 | Agerbak et al. | |
| 2013/0254663 A1* | 9/2013 | Bates | G06F 3/16 715/716 |
| 2013/0346859 A1* | 12/2013 | Bates | H04N 21/25816 715/716 |
| 2014/0006587 A1* | 1/2014 | Kusano | H04N 21/44209 709/224 |
| 2014/0233755 A1 | 8/2014 | Kim et al. | |
| 2016/0112746 A1 | 4/2016 | Zhang et al. | |

FOREIGN PATENT DOCUMENTS

| | | |
|---|---|---|
| CN | 102567240 A | 7/2012 |
| CN | 102891657 A | 1/2013 |
| EP | 1389853 A1 | 2/2004 |
| EP | 1504367 A2 | 2/2005 |
| EP | 2478714 A1 | 7/2012 |
| JP | 2012142907 A | 7/2012 |
| JP | 2013131956 A | 7/2013 |
| WO | 200153994 | 7/2001 |
| WO | 2003093950 A2 | 11/2003 |
| WO | 2004002069 A1 | 12/2003 |
| WO | 2012030733 A1 | 3/2012 |
| WO | 2013101727 | 7/2013 |
| WO | 2013101727 A1 | 7/2013 |
| WO | 2013101729 A1 | 7/2013 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Chinese Patent Office, First Office Action and Translation dated Mar. 18, 2021, issued in connection with Chinese Application No. 2019-10922496, 6 pages.

(56) References Cited

OTHER PUBLICATIONS

Chinese Patent Office, Office Action dated Aug. 21, 2018, issued in connection with Chinese Application No. 20148005333555, 18 pages.
Chinese Patent Office, Second Office Action and Translation dated Apr. 11, 2019, issued in connection with Chinese Application No. 201480053355.5, 7 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Examination Report dated May 8, 2018, issued in connection with European Application No. 14847871.2, 5 pages.
European Patent Office, Extended European Search Report dated Oct. 4, 2016, issued in connection with European Application No. 14847871.2, 8 pages.
Final Office Action dated Jun. 21, 2016, issued in connection with U.S. Appl. No. 14/039,615, filed Sep. 27, 2013, 31 pages.
International Bureau, International Preliminary Report on Patentability dated Apr. 7, 2016, issued in connection with International Patent Application No. PCT/US2014/056498, filed on Sep. 19, 2014, 8 pages.
International Searching Authority, International Search Report dated Dec. 24, 2014, issued in connection with International Application No. PCT/US2014/056498, 3 pages.
International Searching Authority, Written Opinion dated Dec. 24, 2014, issued in connection with International Application No. PCT/US2014/056498, filed on Sep. 19, 2014, 6 pages.
Japanese Patent Office, Full English Translation of Office Action dated May 23, 2017, issued in connection with Japanese Patent Application No. 2016-517479, 5 pages.
Japanese Patent Office, Office Action and Translation dated Sep. 10, 2019, issued in connection with Japanese Patent Application No. 2018-192654, 15 pages.
Japanese Patent Office, Office Action dated May 23, 2017, issued in connection with Japanese Application No. 2016-517479, 8 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Jan. 11, 2016, issued in connection with U.S. Appl. No. 14/039,615, filed Sep. 27, 2013, 27 pages.
Non-Final Office Action dated May 15, 2017, issued in connection with U.S. Appl. No. 14/039,615, filed Sep. 27, 2013, 34 pages.
Non-Final Office Action dated Dec. 17, 2021, issued in connection with U.S. Appl. No. 17/222,393, filed Apr. 5, 2021, 15 pages.
Non-Final Office Action dated Dec. 30, 2019, issued in connection with U.S. Appl. No. 15/942,818, filed Apr. 2, 2018, 20 pages.
Notice of Allowance dated Aug. 20, 2020, issued in connection with U.S. Appl. No. 15/942,818, filed Apr. 2, 2018, 8 pages.
Notice of Allowance dated Nov. 20, 2017, issued in connection with U.S. Appl. No. 14/039,615, filed Sep. 27, 2013, 9 pages.
Notice of Allowance dated Jul. 27, 2022, issued in connection with U.S. Appl. No. 17/222,393, filed Apr. 5, 2021, 7 pages.
Palm, Inc., "Handbook for the Palm VII Handheld," May 2000, 311 pages.
Patterson, Ben, "Sonos Play: 3 audio system brings wireless music to any room, minus hassle (review)," Jul. 27, 2011, http://heresthethingblog.com/2011/07/27/sonos-play3-brings-wireless-music/, pp. 1-5.
Presentations at WinHEC 2000, May 2000, 138 pages.
Prismiq, Inc., "Prismiq Media Player User Guide," 2003, 44 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

MULTI-HOUSEHOLD SUPPORT

CROSS REFERENCE TO RELATED APPLICATIONS

This application claims priority under 35 U.S.C. § 120 to, and is a continuation of, U.S. patent application Ser. No. 17/222,393 filed on Apr. 5, 2021, entitled "Multi-Household Support," the contents of which are incorporated by reference herein in their entirety.

U.S. patent application Ser. No. 17/222,393 claims priority under 35 U.S.C. § 120 to, and is a continuation of, U.S. patent application Ser. No. 15/942,818, filed on Apr. 2, 2018, entitled "Multi-Household Support," and issued as U.S. Pat. No. 10,969,940 on Apr. 6, 2021, the contents of which are incorporated by reference herein in their entirety.

U.S. patent application Ser. No. 15/942,818 claims priority under 35 U.S.C. § 120 to, and is a continuation of, U.S. patent application Ser. No. 14/039,615, filed on Sep. 27, 2013, entitled "Multi-Household Support," and issued as U.S. Pat. No. 9,933,920 on Apr. 3, 2018, the contents of which are incorporated by reference herein in their entirety.

FIELD OF THE DISCLOSURE

The disclosure is related to consumer goods and, more particularly, to methods, systems, products, features, services, and other items directed to media playback or some aspect thereof.

BACKGROUND

Digital music has become readily available due in part to the development of consumer level technology that has allowed people to listen to digital music on a personal audio device. The consumer's increasing preference for digital audio has also resulted in the integration of personal audio devices into PDAs, cellular phones, and other mobile devices. The portability of these mobile devices has enabled people to take the music listening experience with them and outside of the home. People have become able to consume digital music, like digital music files or even Internet radio, in the home through the use of their computer or similar devices. Now there are many different ways to consume digital music, in addition to other digital content including digital video and photos, stimulated in many ways by high-speed Internet access at home, mobile broadband Internet access, and the consumer's hunger for digital media.

Until recently, options for accessing and listening to digital audio in an out-loud setting were severely limited. In 2005, Sonos offered for sale its first digital audio system that enabled people to, among many other things, access virtually unlimited sources of audio via one or more networked connected zone players, dynamically group or ungroup zone players upon command, wirelessly send the audio over a local network amongst zone players, and play the digital audio out loud across multiple zone players in synchrony. The Sonos system can be controlled by software applications running on network capable mobile devices and computers.

Given the insatiable appetite of consumers towards digital media, there continues to be a need to develop consumer technology that revolutionizes the way people access and consume digital media.

BRIEF DESCRIPTION OF THE DRAWINGS

Features, aspects, and advantages of the presently disclosed technology may be better understood with regard to the following description, appended claims, and accompanying drawings where:

Figure 1:
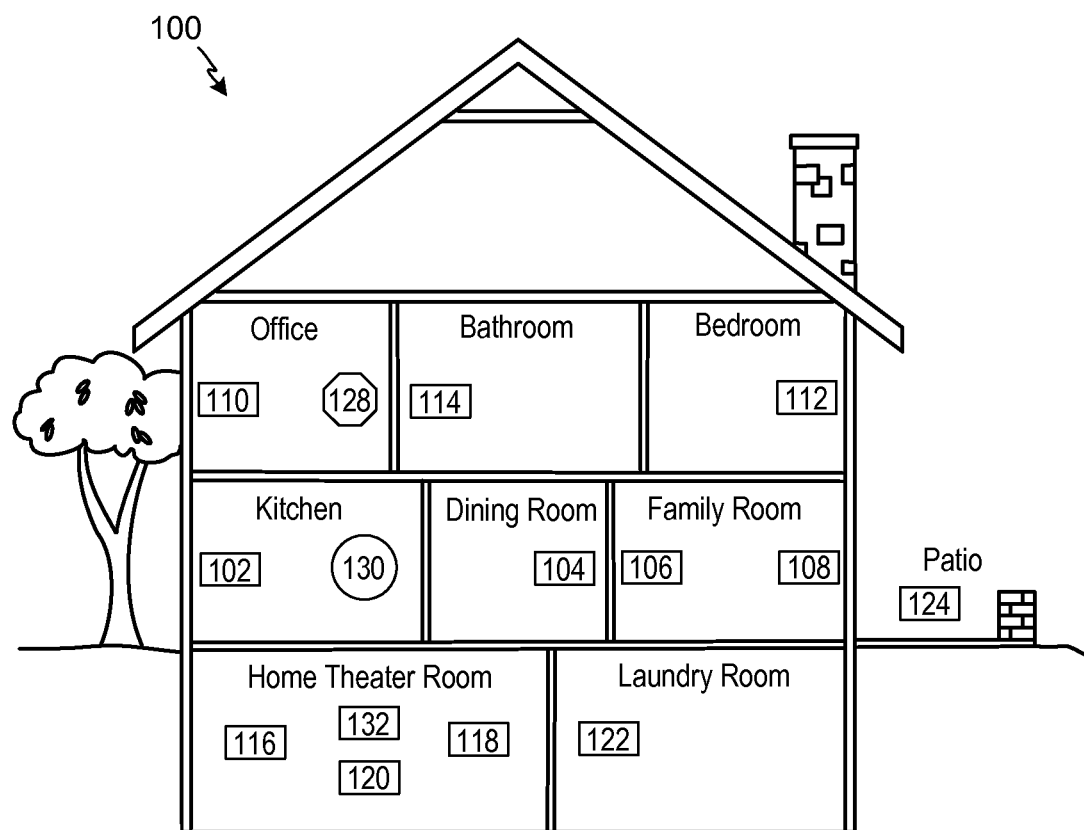
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

Embodiments described herein may involve enabling a user to control multiple media playback systems with a single mobile device. In one scenario, a user may have a first media playback system at his or her residence and a second media playback system at his or her place of work. In another scenario, a user may have a first media playback system at his or her residence and the user's friend may have a second media playback system at their residence. In yet another scenario, a user may have multiple media playback systems at his or her residence. In each scenario, the present disclosure describes a method and corresponding system that enables the user to control the first media playback system and the second media playback system with a single mobile device.

In one example, a mobile device may be registered with a first media playback system having a first household identifier (HHID) and the mobile device may also be registered with a second media playback system having a second HHID. When a user launches a controller software application, the mobile device may send a multicast search message to search for an HHID corresponding to a media playback system. The mobile device may connect with the first or second media playback system based on receiving the first or second HHID, respectively. Once connected, the user may control either the first or second media playback system using the mobile device. If the mobile device receives both the first and second HHIDs, the mobile device may connect with either the first or second media playback system based on a priority of the first and second media playback systems. In one example, the priority is determined based on a location of the mobile device. In another example, the priority is determined based on the order in which each HHID is received by the mobile device.

If the user launches the controller application on the mobile device and neither the first nor second HHIDs are received by the mobile device, the user may be prompted to add a third media playback system if the mobile device receives a third HHID. In response to the prompt, the user interface of the mobile device may receive an input to connect the mobile device to the third media playback system, and a connection may be established between the mobile device and the third media playback system.

A list of registered households may be stored in the data storage of the mobile device. Further, the user may remove a household from the list of registered households. For example, the user interface of the mobile device may receive an input to forget the first HHID, and the mobile device will no longer connect to the first media playback system. Other examples are possible as well.

As indicated above, the present application involves enabling a user to control multiple media playback systems with a single mobile device. In one aspect, a method is provided. The method involves associating a mobile device to a first media playback system having a first HHID and associating the mobile device to a second media playback system having a second HHID. The method further involves connecting the mobile device to the first or second media playback systems based on receiving, by the mobile device, the first or second HHID, respectively. The method further involves using the mobile device to send one or more control commands to the connected first or second media playback system for audio playback. The method further involves not connecting the mobile device to a third media playback system based on receiving, by the mobile device, a third HHID.

In another aspect, a device is provided. The device includes a processor and computer readable medium having stored thereon instructions executable by the processor to perform function. The functions include associating a mobile device to a first media playback system having a first HHID and associating the mobile device to a second media playback system having a second HHID. The functions further include connecting the mobile device to the first or second media playback systems based on receiving, by the mobile device, the first or second HHID, respectively. The functions further include using the mobile device to send one or more control commands to the connected first or second media playback system for audio playback. The functions further include not connecting the mobile device to a third media playback system based on receiving, by the mobile device, a third HHID.

In yet another aspect, a non-transitory computer readable memory is provided. The non-transitory computer readable memory has stored thereon instructions executable by a computing device to cause the computing device to perform functions. The functions include associating a mobile device to a first media playback system having a first HHID and associating the mobile device to a second media playback system having a second HHID. The functions further include connecting the mobile device to the first or second media playback systems based on receiving, by the mobile device, the first or second HHID, respectively. The functions further include using the mobile device to send one or more control commands to the connected first or second media playback system for audio playback. The functions further include not connecting the mobile device to a third media playback system based on receiving, by the mobile device, a third HHID.

Other embodiments, as those discussed in the following and others as can be appreciated by one having ordinary skill in the art are also possible.

II. Example Operating Environment

Referring now to the drawings, in which like numerals can refer to like parts throughout the figures, FIG. 1 shows an example media system configuration 100 in which one or more embodiments disclosed herein can be practiced or implemented.

By way of illustration, the media system configuration 100 is associated with a home having multiple zones, although it should be understood that the home could be configured with only one zone. Additionally, one or more zones can be added to the configuration 100 over time. Each zone may be assigned by a user to a different room or space, such as, for example, an office, bathroom, bedroom, kitchen, dining room, family room, home theater room, utility or laundry room, and patio. A single zone might also include multiple rooms or spaces if so configured. With respect to FIG. 1, one or more of zone players 102-124 are shown in each respective zone. Zone players 102-124, also referred to herein as playback devices, multimedia units, speakers, players, and so on, provide audio, video, and/or audiovisual output. A controller 130 (e.g., shown in the kitchen for purposes of this illustration) provides control to the media system configuration 100. Controller 130 may be fixed to a zone, or alternatively, mobile such that it can be moved about the zones. The media system configuration 100 may also include more than one controller 130, and additional controllers may be added to the system over time.

The media system configuration 100 illustrates an example whole house media system, though it is understood that the technology described herein is not limited to, among other things, its particular place of application or to an expansive system like a whole house media system 100 of FIG. 1.

a. Example Zone Players

Figure 2A:
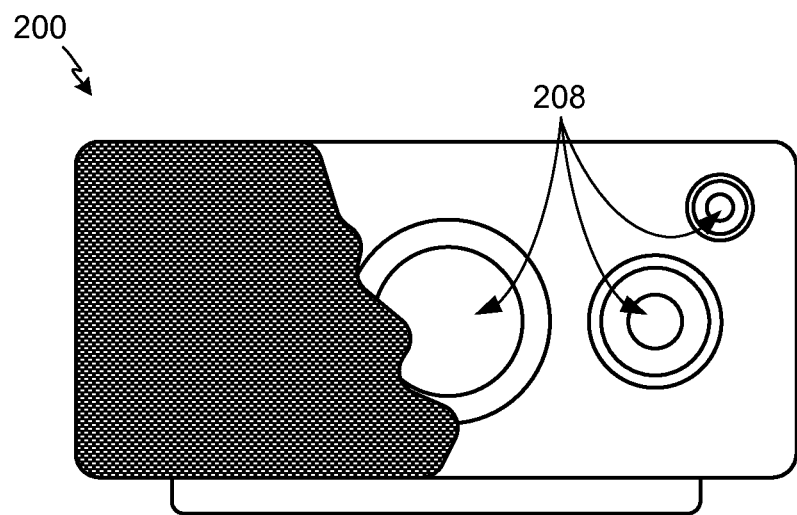
FIG. 2A shows an illustration of an example zone player having a built-in amplifier and transducers.
Figure 2B:
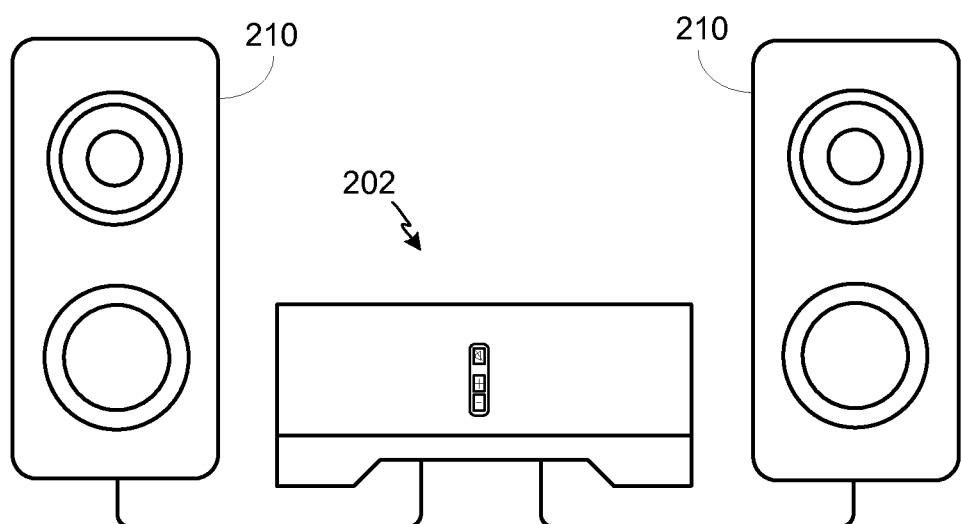
FIG. 2B shows an illustration of an example zone player having a built-in amplifier and connected to external speakers.
Figure 2C:
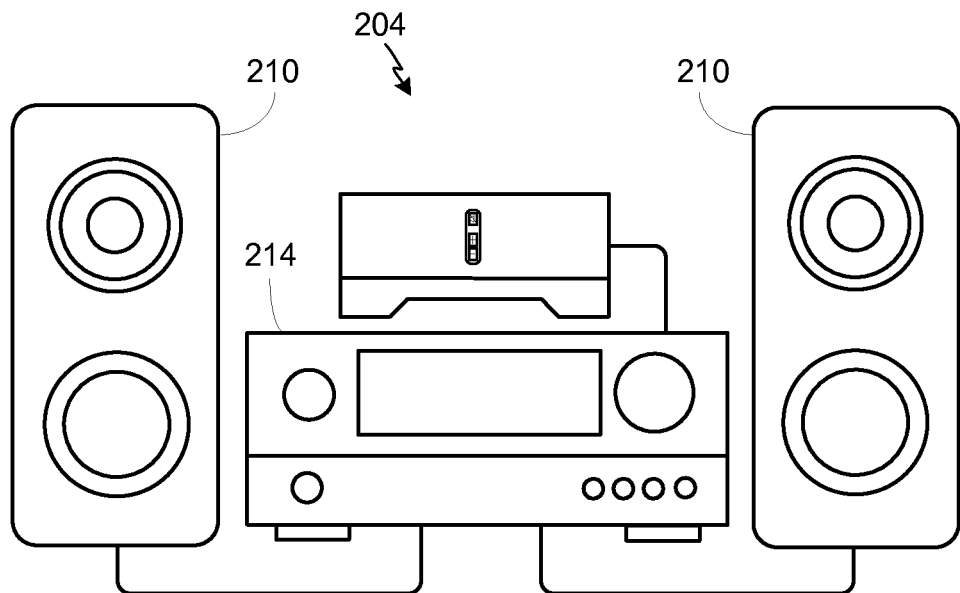
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates a zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 may be dynamically configured to reproduce a subset of full-range sound, such as when zone player 200 is grouped with other zone players to play stereophonic audio, monaural audio, and/or surround audio or when the media content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a particular zone player in a zone or zone group may be assigned to a playback queue (or "queue"). The playback queue contains information corresponding to zero or more audio items for playback by the associated zone or zone group. The playback queue may be stored in memory on a zone player or some other designated device. Each item contained in the playback queue may comprise a uniform resource identifier (URI) or some other identifier that can be used by the zone player(s) to seek out and/or retrieve the audio items from the identified audio source(s). Depending on the item, the audio source might be found on the Internet (e.g., the cloud), locally from another device over the data network 128 (described further below), from the controller 130, stored on the zone player itself, or from an audio source communicating directly to the zone player. In some embodiments, the zone player can reproduce the audio itself (e.g., play the audio), send the audio to another zone player for reproduction, or both where the audio is reproduced by the zone player as well as one or more additional zone players (possibly in synchrony). In some embodiments, the zone player may play a first audio content (or alternatively, may not play the content at all), while sending a second, different audio content to another zone player(s) for reproduction. To the user, each item in a playback queue is represented on an interface of a controller by an element such as a track name, album name, radio station name, playlist, or other some other representation. A user can populate the playback queue with audio items of interest. The user may also modify and clear the playback queue, if so desired.

By way of illustration, SONOS, Inc. of Santa Barbara, Calif. presently offers for sale zone players referred to as a "PLAY:5," "PLAY:3," "PLAYBAR," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player may include or interact with a docking station for an Apple iPod™ or similar device.

b. Example Controllers

Figure 3:
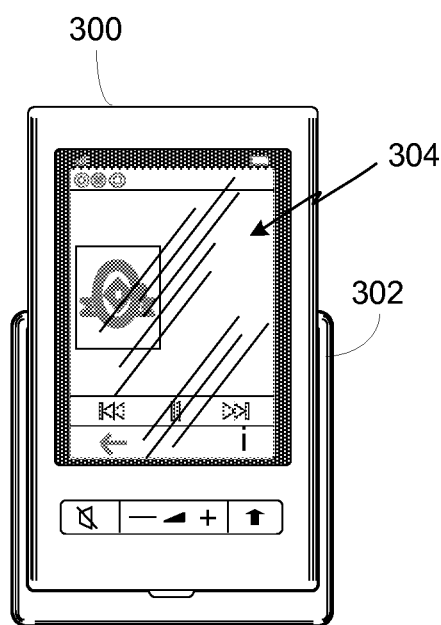
FIG. 3 shows an illustration of an example controller.

FIG. 3 illustrates an example wireless controller 300 in docking station 302. By way of illustration, controller 300 may correspond to controlling device 130 of FIG. 1. Docking station 302, if provided or used, may provide power to the controller 300 and additionally may charge a battery of controller 300. In some embodiments, controller 300 may be provided with a touch screen 304 that allows a user to interact through touch with the controller 300, for example, to retrieve and navigate a playlist of audio items, modify and/or clear the playback queue of one or more zone players, control other operations of one or more zone players, and provide overall control of the system configuration 100. In other embodiments, other input mechanisms such as voice control may be used to interact with the controller 300. In certain embodiments, any number of controllers can be used to control the system configuration 100. In some embodiments, there may be a limit set on the number of controllers that can control the system configuration 100. The controllers might be wireless like wireless controller 300 or wired to data network 128.

In some embodiments, if more than one controller is used in system 100 of FIG. 1, each controller may be coordinated to display common content, and may all be dynamically updated to indicate changes made to the system 100 from a single controller. Coordination can occur, for instance, by a controller periodically requesting a state variable directly or indirectly from one or more of the zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an iPhone™, iPad™, Android™ powered phone or tablet, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by Sonos, Inc. of Santa Barbara, Calif. include a "Controller 200," "SONOS® CONTROL," "SONOS® Controller for iPhone™," "SONOS® Controller for iPad™," "SONOS® Controller for Android™," "SONOS® Controller for Mac™ or PC."

c. Example Data Connection

Zone players 102-124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players are coupled to data network 128 using a centralized access point such as a wired or wireless router. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, a "bonded zone" is a zone that contains two or more zone players, such as the two zone players 106 and 108 in the family room, whereby the two zone players 106 and 108 can be configured to play the same audio source in synchrony. In one example, the two zone players 106 and 108 can be paired to play two separate sounds in left and right channels, for example. In other words, the stereo effects of a sound can be reproduced or enhanced through the two zone players 106 and 108, one for the left sound and the other for the right sound. In another example two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player has additional speaker drivers from which sound can be passed. The consolidated zone player can further be paired with a single zone player or yet another consolidated zone player. Each playback device of a consolidated playback device can be set in a consolidated mode, for example.

In certain embodiments, paired zone players (also referred to as "bonded zone players") can play audio in synchrony with other zone players in the same or different zones.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for an individual to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, audio on a zone player itself may be accessed and played. In some embodiments, audio on a controller may be accessed via the data network 128 and played. In some embodiments, music from a personal library stored on a computer or networked-attached storage (NAS) may be accessed via the data network 128 and played. In some embodiments, Internet radio stations, shows, and podcasts may be accessed via the data network 128 and played. Music or cloud services that let a user stream and/or download music and audio content may be accessed via the data network 128 and played. Further, music may be obtained from traditional sources, such as a turntable or CD player, via a line-in connection to a zone player, for example. Audio content may also be accessed using a different protocol, such as Airplay™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 may be shared with any of the zone players 102-124 in the audio system 100.

III. Example Zone Players

Figure 4:
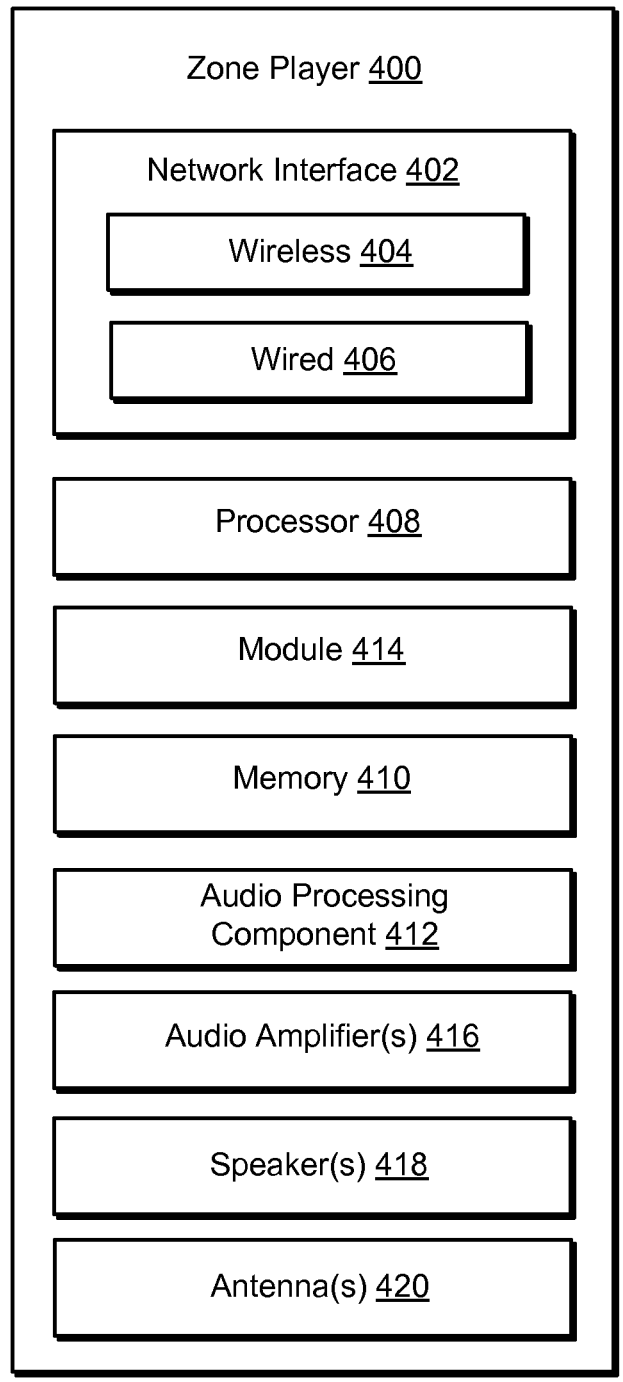
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, 802.11ac, 802.15, 4G mobile communication standard, and so on). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for playback through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY: 5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

IV. Example Controller

Figure 5:
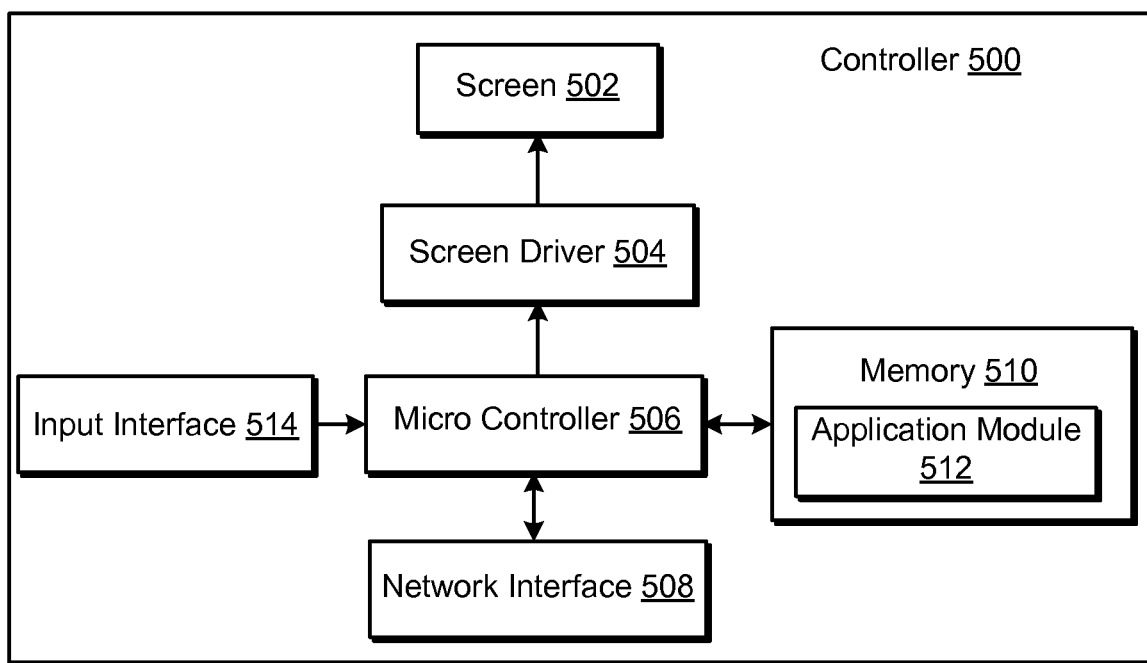
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.11ac, 802.15, 4G mobile communication standard, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group to facilitate synchronized playback amongst the zone players in the zone group. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an iPhone™, iPad™ or any other smart phone or network-enabled device (e.g., a networked computer such as a PC or Mac™) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group playback an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio playback is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer. In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed or learned action. Other kinds of zone scenes can be programmed or learned by the system over time.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration and revert the zones to their prior configuration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Playback Queue

As discussed above, in some embodiments, a zone player may be assigned to a playback queue identifying zero or more media items for playback by the zone player. The media items identified in a playback queue may be represented to the user via an interface on a controller. For instance, the representation may show the user (or users if more than one controller is connected to the system) how the zone player is traversing the playback queue, such as by highlighting the "now playing" item, graying out the previously played item(s), highlighting the to-be-played item(s), and so on.

In some embodiments, a single zone player is assigned to a playback queue. For example, zone player 114 in the bathroom of FIG. 1 may be linked or assigned to a "Bathroom" playback queue. In an embodiment, the "Bathroom" playback queue might have been established by the system as a result of the user naming the zone player 114 to the bathroom. As such, contents populated and identified in the "Bathroom" playback queue can be played via the zone player 114 (the bathroom zone).

In some embodiments, a zone or zone group is assigned to a playback queue. For example, zone players 106 and 108 in the family room of FIG. 1 may be linked or assigned to a "Family room" playback queue. In another example, if family room and dining room zones were grouped, then the new group would be linked or assigned to a family room+dining room playback queue. In some embodiments, the family room+dining room playback queue would be established based upon the creation of the group. In some embodiments, upon establishment of the new group, the family room+dining room playback queue can automatically include the contents of one (or both) of the playback queues associated with either the family room or dining room or both. In one instance, if the user started with the family room and added the dining room, then the contents of the family room playback queue would become the contents of the family room+dining room playback queue. In another instance, if the user started with the family room and added the dining room, then the family room playback queue would be renamed to the family room+dining room playback queue. If the new group was "ungrouped," then the family room+dining room playback queue may be removed from the system and/or renamed to one of the zones (e.g., renamed to "family room" or "dining room"). After ungrouping, each of the family room and the dining room will be assigned to a separate playback queue. One or more of the zone players in the zone or zone group may store in memory the associated playback queue.

As such, when zones or zone groups are "grouped" or "ungrouped" dynamically by the user via a controller, the system will, in some embodiments, establish or remove/rename playback queues respectively, as each zone or zone group is to be assigned to a playback queue. In other words, the playback queue operates as a container that can be populated with media items for playback by the assigned zone. In some embodiments, the media items identified in a playback queue can be manipulated (e.g., re-arranged, added to, deleted from, and so on).

Figure 6:
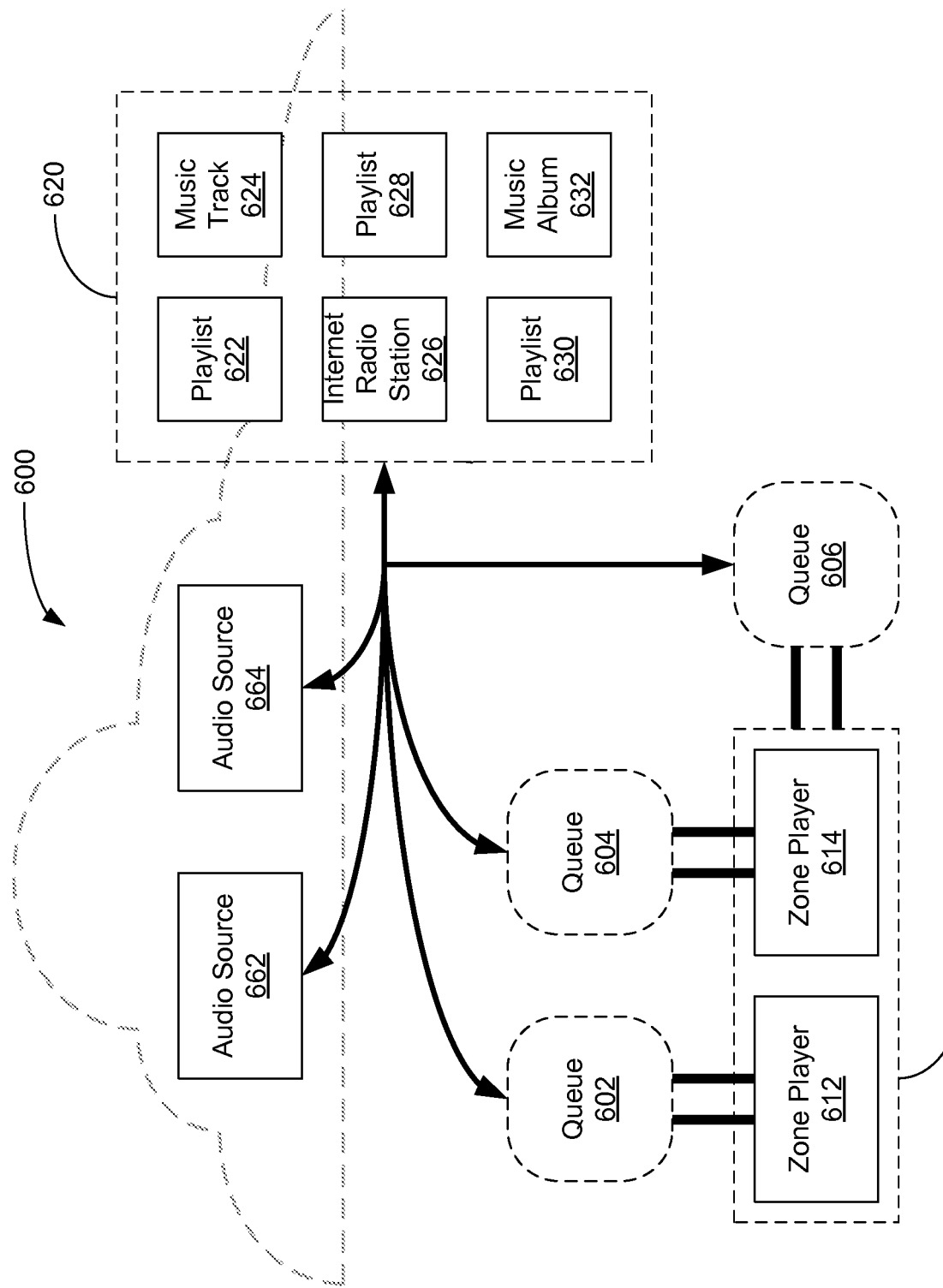
FIG. 6 shows an example playback queue configuration for a media playback system.

By way of illustration, FIG. 6 shows an example network 600 for media content playback. As shown, the example network 600 includes example zone players 612 and 614, example audio sources 662 and 664, and example media items 620. The example media items 620 may include playlist 622, music track 624, favorite Internet radio station 626, playlists 628 and 630, and album 632. In one embodiment, the zone players 612 and 614 may be any of the zone players shown in FIGS. 1, 2, and 4. For instance, zone players 612 and 614 may be the zone players 106 and 108 in the Family Room.

In one example, the example audio sources 662 and 664, and example media items 620 may be partially stored on a cloud network, discussed more below in connection to FIG. 8. In some cases, the portions of the audio sources 662, 664, and example media items 620 may be stored locally on one or both of the zone players 612 and 614. In one embodiment, playlist 622, favorite Internet radio station 626, and playlist 630 may be stored locally, and music track 624, playlist 628, and album 632 may be stored on the cloud network.

Each of the example media items 620 may be a list of media items playable by a zone player(s). In one embodiment, the example media items may be a collection of links or pointers (i.e., URI) to the underlying data for media items that are stored elsewhere, such as the audio sources 662 and 664. In another embodiment, the media items may include pointers to media content stored on the local zone player, another zone player over a local network, or a controller device connected to the local network.

As shown, the example network 600 may also include an example queue 602 associated with the zone player 612, and an example queue 604 associated with the zone player 614. Queue 606 may be associated with a group, when in existence, comprising zone players 612 and 614. Queue 606 might comprise a new queue or exist as a renamed version of queue 602 or 604. In some embodiments, in a group, the zone players 612 and 614 would be assigned to queue 606 and queue 602 and 604 would not be available at that time. In some embodiments, when the group is no longer in existence, queue 606 is no longer available. Each zone player and each combination of zone players in a network of zone players, such as those shown in FIG. 1 or that of example zone players 612, 614, and example combination 616, may be uniquely assigned to a corresponding playback queue.

A playback queue, such as playback queues 602-606, may include identification of media content to be played by the corresponding zone player or combination of zone players. As such, media items added to the playback queue are to be played by the corresponding zone player or combination of zone players. The zone player may be configured to play items in the queue according to a specific order (such as an order in which the items were added), in a random order, or in some other order.

The playback queue may include a combination of playlists and other media items added to the queue. In one embodiment, the items in playback queue 602 to be played by the zone player 612 may include items from the audio sources 662, 664, or any of the media items 622-632. The playback queue 602 may also include items stored locally on the zone player 612, or items accessible from the zone player 614. For instance, the playback queue 602 may include Internet radio 626 and album 632 items from audio source 662, and items stored on the zone player 612.

When a media item is added to the queue via an interface of a controller, a link to the item may be added to the queue. In a case of adding a playlist to the queue, links to the media items in the playlist may be provided to the queue. For example, the playback queue 602 may include pointers from the Internet radio 626 and album 632, pointers to items on the audio source 662, and pointers to items on the zone player 612. In another case, a link to the playlist, for example, rather than a link to the media items in the playlist may be provided to the queue, and the zone player or combination of zone players may play the media items in the playlist by accessing the media items via the playlist. For example, the album 632 may include pointers to items stored on audio source 662. Rather than adding links to the items on audio source 662, a link to the album 632 may be added to the playback queue 602, such that the zone player 612 may play the items on the audio source 662 by accessing the items via pointers in the album 632.

In some cases, contents as they exist at a point in time within a playback queue may be stored as a playlist, and subsequently added to the same queue later or added to another queue. For example, contents of the playback queue 602, at a particular point in time, may be saved as a playlist, stored locally on the zone player 612 and/or on the cloud network. The saved playlist may then be added to playback queue 604 to be played by zone player 614.

VI. Example Ad-Hoc Network

Figure 7:
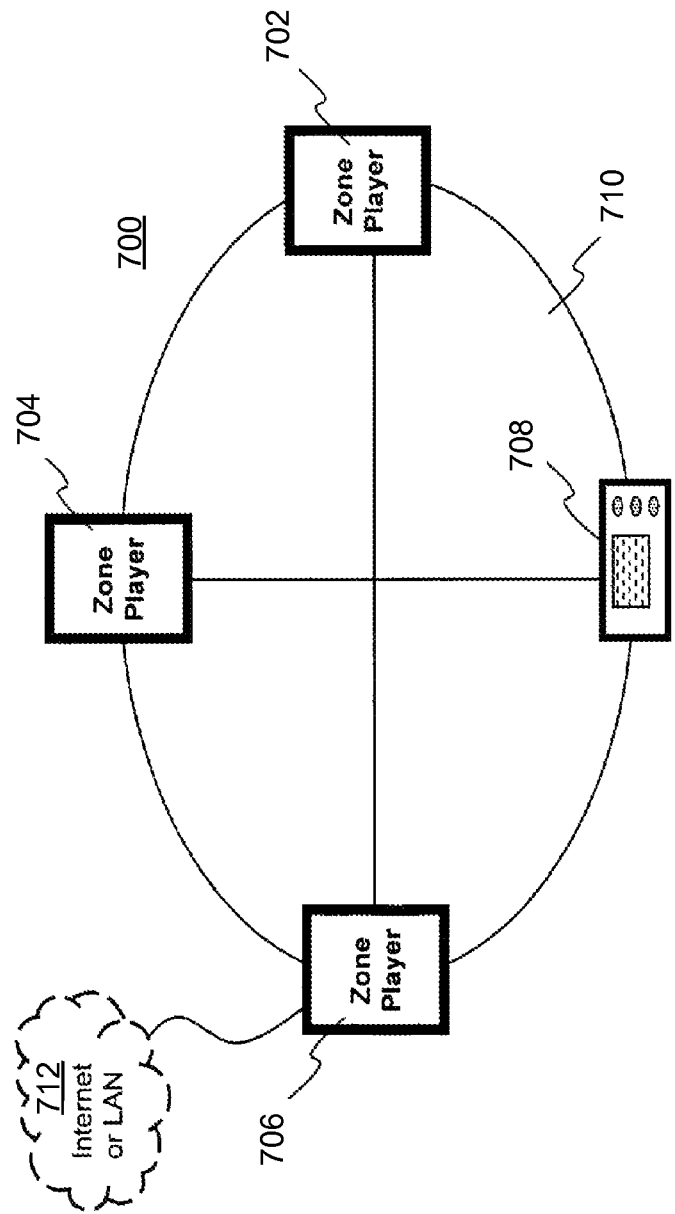
FIG. 7 shows an example ad-hoc playback network.

Particular examples are now provided in connection with FIG. 7 to describe, for purposes of illustration, certain embodiments to provide and facilitate connection to a playback network. FIG. 7 shows that there are three zone players 702, 704 and 706 and a controller 708 that form a network branch that is also referred to as an Ad-Hoc network 710. The network 710 may be wireless, wired, or a combination of wired and wireless technologies. In general, an Ad-Hoc (or "spontaneous") network is a local area network or other small network in which there is generally no one access point for all traffic. With an established Ad-Hoc network 710, the devices 702, 704, 706 and 708 can all communicate with each other in a "peer-to-peer" style of communication, for example. Furthermore, devices may join and/or leave from the network 710, and the network 710 will automatically reconfigure itself without needing the user to reconfigure the network 710. While an Ad-Hoc network is referenced in FIG. 7, it is understood that a playback network may be based on a type of network that is completely or partially different from an Ad-Hoc network.

Using the Ad-Hoc network 710, the devices 702, 704, 706, and 708 can share or exchange one or more audio sources and be dynamically grouped (or ungrouped) to play the same or different audio sources. For example, the devices 702 and 704 are grouped to playback one piece of music, and at the same time, the device 706 plays back another piece of music. In other words, the devices 702, 704, 706 and 708, as shown in FIG. 7, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 710 (or household identifier), though a HOUSEHOLD may be identified with a different area or place.

In certain embodiments, a household identifier (HHID) is a short string or an identifier that is computer-generated to help ensure that it is unique. Accordingly, the network 710 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy) or other security keys. In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., security keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 706 in FIG. 7 is shown to be connected to both networks, for example. The connectivity to the network 712 is based on Ethernet and/or Wireless, while the connectivity to other devices 702, 704 and 708 is based on Wireless and Ethernet if so desired.

It is understood, however, that in some embodiments each zone player 706, 704, 702 may access the Internet when retrieving media from the cloud (e.g., the Internet) via the bridging device. For example, zone player 702 may contain a uniform resource locator (URL) that specifies an address to a particular audio track in the cloud. Using the URL, the zone player 702 may retrieve the audio track from the cloud, and ultimately play the audio out of one or more zone players.

VII. Another Example System Configuration

Figure 8:
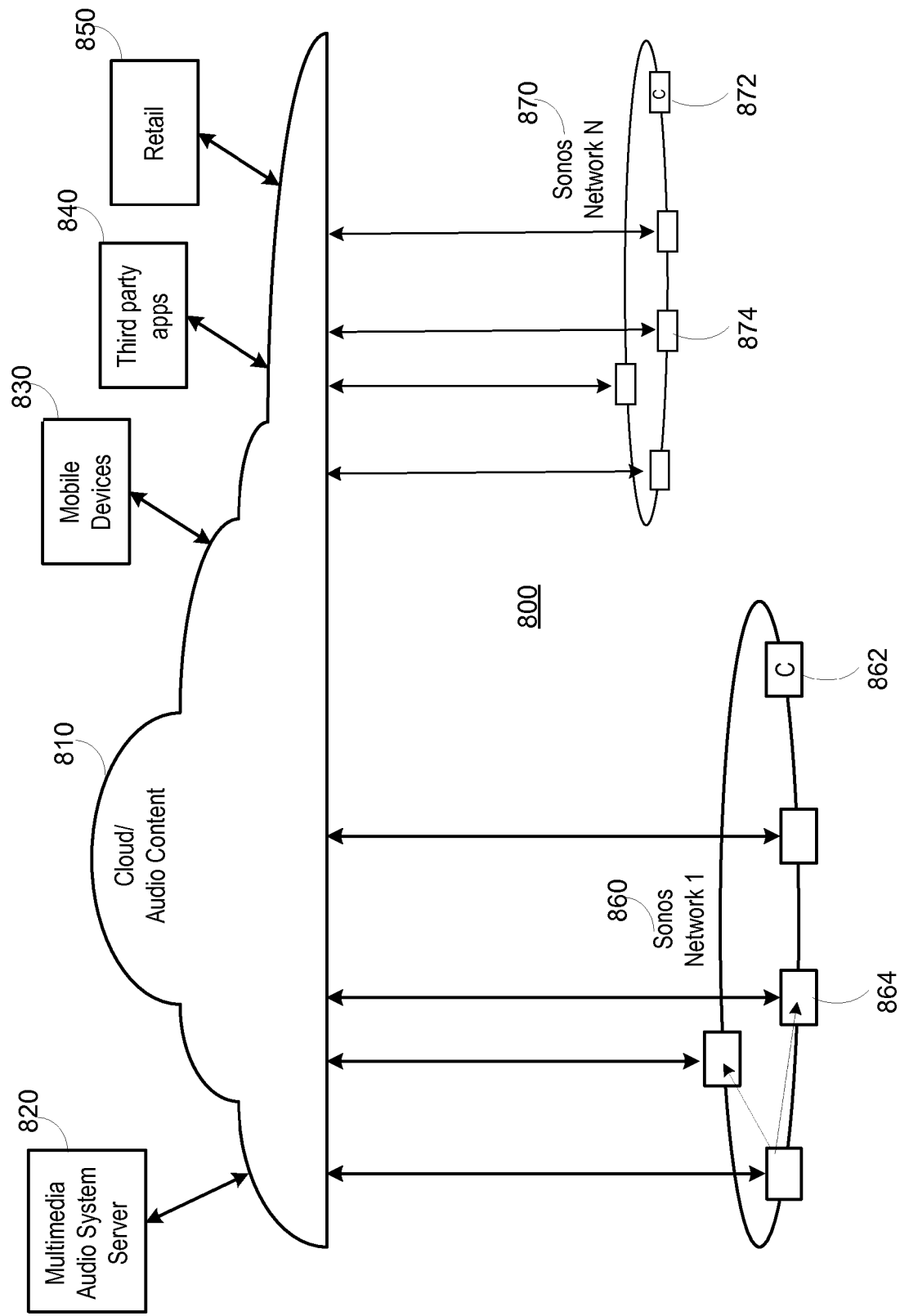
FIG. 8 shows a system including a plurality of networks including a cloud-based network and at least one local playback network.

FIG. 8 shows a system 800 including a plurality of interconnected networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 800 of FIG. 8, a plurality of content providers 820-850 can be connected to one or more local playback networks 860-870 via a cloud and/or other network 810. Using the cloud 810, a multimedia audio system server 820 (e.g., Sonos™), a mobile device 830, a third party application 840, a content provider 850 and so on can provide multimedia content (requested or otherwise) to local playback networks 860, 870. Within each local playback network 860, 870, a controller 862, 872 and a playback device 864, 874 can be used to playback audio content.

VIII. Example Multi-Household Support for Multiple Media Playback Systems

Figure 9A:
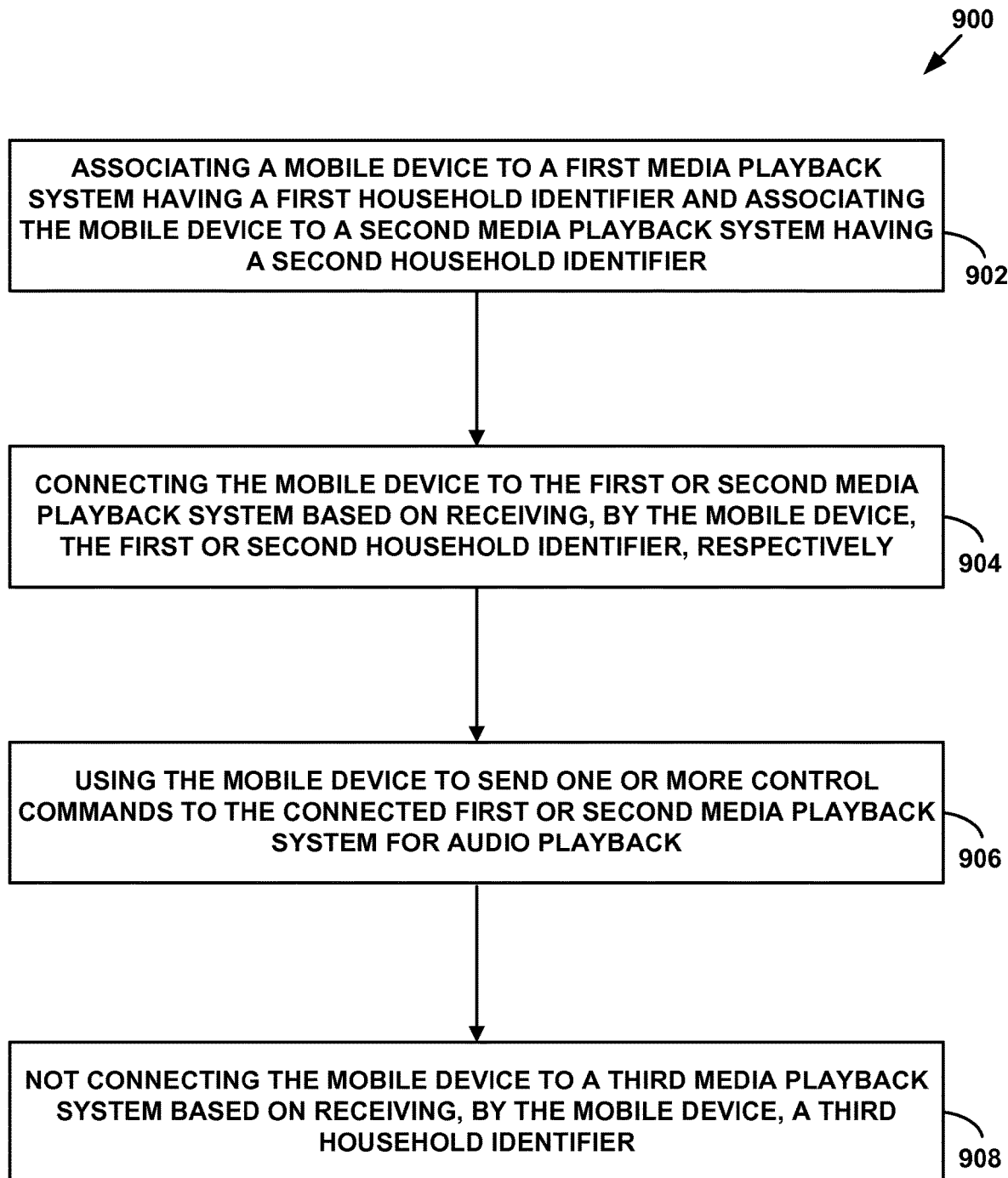
FIG. 9A shows an example flow diagram for connecting a mobile device to a media playback system.

As discussed above, embodiments described herein may involve enabling a user to control multiple media playback systems with a single mobile device. FIG. 9A shows an example flow diagram for connecting a mobile device to multiple media playback systems, in accordance with at least some embodiments described herein. Method 900 shown in FIG. 9A presents an embodiment of a method that could be used in the environments 100, 600, 700 and 800 with the systems 200, 202, 204, 300, 400, and 500 for example, in communication with one or more devices, such as those illustrated in FIGS. 2-5. Method 900 may include one or more operations, functions, or actions as illustrated by one or more of blocks 902-908. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 900 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 800 and other processes and methods disclosed herein, each block in FIG. 9A may represent circuitry that is wired to perform the specific logical functions in the process.

At block 902, the method 900 involves associating a mobile device to a first media playback system having a first HHID and associating the mobile device to a second media playback system having a second HHID. As used herein, a mobile device includes any network-enabled portable device, such as an IPHONE™ IPAD™ ANDROID™ powered phone or tablet, or any other smart phone or network-enabled device.

As discussed above, the term HOUSEHOLD (provided in uppercase letters to disambiguate from the user's domicile) is used to represent a collection of networked media playback devices that are cooperating to provide an application or service. An instance of a HOUSEHOLD is identified with an HHID. In certain embodiments, an HHID is a short string or an identifier that is computer-generated to help ensure that it is unique. Accordingly, a media playback system can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy) or other security keys. In certain embodiments, SSID is set to be the same as HHID. Other examples are possible as well. Additional description of the use of HHIDs and of the association of various devices to HOUSEHOLDs can be found in U.S. Pat. No. 8,326,951, also assigned to SONOS, Inc., the contents of which are incorporated by reference herein.

The mobile device may include a software application configured to operate as a controller for one or more media playback systems. Through the controller software application, the mobile device may send a search message to search for an HHID corresponding to a media playback system. The search message may be a multicast message sent over a local area network. In addition, the search message may specifically identify either the first HHID or the second HHID. As an alternative, the search message may simply request any HHID. In response to the search message, one or more devices on the network may respond to the search message by providing a HHID associated with the device(s).

In another example embodiment, the controller device does not send out a search message. Instead, one or more devices on the network may periodically broadcast the HHID associated with the device(s). An application on the controller device may listen for the HHID broadcast to identify an available HOUSEHOLD.

The mobile device may detect the first HHID corresponding to the first media playback system, and responsively, the user interface of the mobile device may display on a display screen or alternate user interface an invitation to connect the mobile device to the first media playback system. The mobile device may receive an input to connect the mobile device to the first media playback system, and a connection between the mobile device and the first media playback system may be established and the HHID may be registered to the mobile device. Further, the mobile device may detect the second HHID corresponding to a second media playback system, and may also establish a connection between the mobile device and the second media playback system and register the HHID to the mobile device using the just described method. The mobile device may store a list of registered HHIDs in the data storage of the mobile device, including the first HHID and the second HHID.

At block 904, the method 900 involves connecting the mobile device to the first or second media playback system based on receiving, by the mobile device, the first or second HHID, respectively. As discussed above, the mobile device may send a multicast search message to search for an HHID corresponding to a media playback system (or simply listen for a message containing an HHID). In one example, if the mobile device receives the first HHID in response to the search message, then the mobile device will automatically connect to the first media playback system. Similarly, if the mobile device receives the second HHID in response to the search message, then the mobile device will automatically connect to the second media playback system.

In one embodiment, the mobile device may determine its location and use the determined location as a further basis for connecting the mobile device to the first or second media playback system. The mobile device may determine its location through a Global Positioning System (GPS) receiver in the mobile device, as an example. In another example, the mobile device may determine its location based on the IP address of the network used to connect with the media playback system. In yet another example, the mobile device may determine its location based on the detection of a wireless network (e.g., by detecting the SSID). Other examples of determining the location of the mobile device are possible as well.

In another embodiment, the mobile device may receive both the first and second HHIDs. This may occur, for example, in a situation where a user has multiple media playback systems in the user's residence, or where the mobile device is detecting a first media playback system. If the mobile device receives both the first and second HHIDs, the mobile device may display an indication on the user interface that both the first and second media systems are available to join, and allow the user to select, via the user interface of the mobile device, either the first or second media playback system for connection.

In another example, if the mobile device receives both the first and second HHIDs, the mobile device may automatically select either the first or second media playback system for connection based on a priority of the first and second media playback systems. In one example, the priority is based on the order in which the HHID is received by the mobile device. For example, if the first HHID is received by the mobile device before the second HHID, the mobile device will select the first media playback system for connection. In another example, the priority is determined based on the location of the mobile device. The first time a user connects the mobile device to a particular media playback system, the mobile device may determine the location of the media playback system and store that information in the data storage of the mobile device. As discussed above, the location may be determined based on information from a GPS receiver in the mobile device, based on the IP address of the network used to connect with the media playback system, or through some other means. When a mobile device receives both the first and second HHIDs, the mobile device may determine its location and compare its current location to the stored locations of the first and second media playback systems. If the current location of the mobile device is closer to the location of the first media playback system, the mobile device may select the first media playback system for connection.

In yet another example, when the mobile device receives both the first and second HHIDs, a geo-fence may be used to determine the priority. A geo-fence is a virtual region specified in relation to a corresponding geographical region. For example, a geo-fence that encircles at least part of a building can be specified with a latitude and longitude pair and a given radius. In other examples, polygons, such as triangles or rectangles, or other shapes can be used to specify a geo-fence. In one embodiment, a first geo-fence may be associated with the first media playback system, and a second geo-fence may be associated with a second media playback system.

The mobile device may determine entry within a particular geo-fence by determining its current location, determining a difference D between the current location and the center point (a, b) of the geo-fence, and comparing the difference D to the radius R of geo-fence. For example, let (x, y) be the current position of the mobile device. The difference D between the mobile device's current position and the center point of the geo-fence is determined as $$D = \sqrt{(x-a)^2 + (y-b)^2}.$$

The difference D can be compared to the radius R of the geo-fence. If D is less than R, then the mobile device is within the boundary of the geo-fence. Similarly, in another example, the difference D can be determined as $D=(x-a)^2+(y-b)^2$. This difference can be compared with the square of the radius of the geo-fence ($R^2$). If D is less than $R^2$, the mobile device is within the boundary of the geo-fence. There are additional mechanisms by which the mobile device may determine whether it is within the geo-fence boundaries as well (e.g., maintaining a list of acceptable coordinates, etc.).

If a mobile device determines it is within the boundary of the first geo-fence associated with the first media playback system, the mobile may select the first media playback system for connection. Further, when a mobile device enters the first geo-fence, the mobile device may be configured to launch the controller software application. In addition, when a mobile device leaves the first geo-fence, the mobile device may be configured to shut down the controller software application. Shutting down the controller software application when the mobile device leaves the first geo-fence may help conserve the battery life of the mobile device. Similar approaches may be used when the mobile device enters and exits a second geo-fence associated with the second media playback system.

At block 906, the method 900 involves using the mobile device to send one or more control commands to the connected first or second media playback system for audio playback. The commands may include volume control, audio playback synchronization between one or more zone players, selection of a playlist or particular song, or other commands to provide overall control of the system configuration. The commands may be received on a controller interface, which may be a software application provided on the mobile device. The controller interface may include a touch screen that allows a user to interact through touch with the mobile device. In other embodiments, other input mechanisms such as voice control may be used to interact with the mobile device.

At block 908, the method 900 involves not connecting the mobile device to a third media playback system based on receiving, by the mobile device, a third HHID. As discussed above, the mobile device may send a multicast search message to search for an HHID corresponding to a media playback system. The mobile device may determine that it did not receive any of its registered HHIDs (e.g., the first HHID or the second HHID). However, the mobile device may detect a third HHID corresponding to a third media playback system. The mobile device will not automatically connect the mobile device to the third media playback system upon receiving the third HHID. Instead, the mobile device can connect to the third media playback system using the method described in FIG. 9B.

Figure 9B:
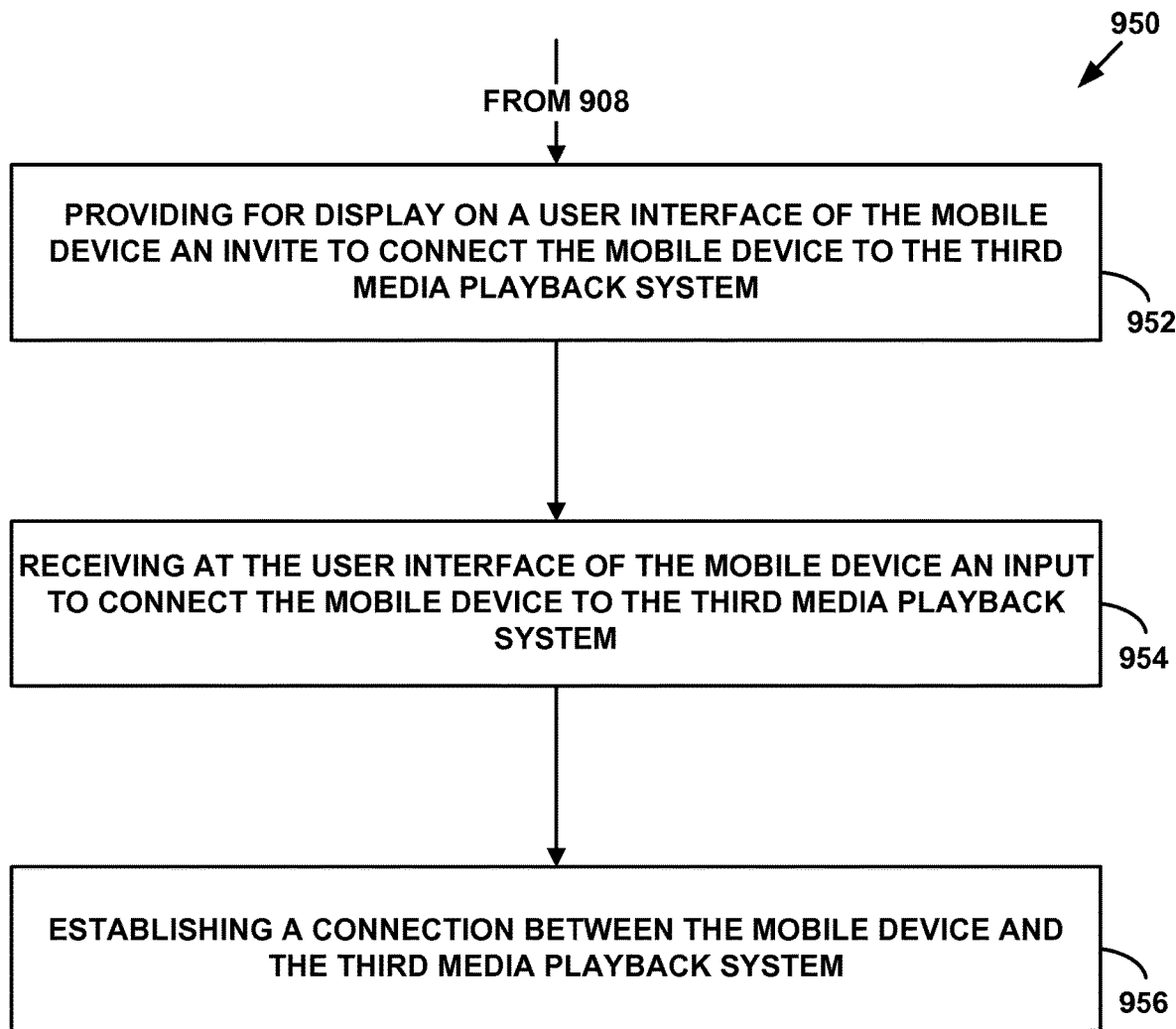
FIG. 9B shows an example flow diagram for connecting to a mobile device to an additional media playback system.

FIG. 9B shows an example flow diagram for connecting to a mobile device to an additional media playback system, which is a continuation of the method 900 shown in FIG. 9A. Method 950 shown in FIG. 9B presents an embodiment of a method that could be used in the environments 100, 600, 700 and 800 with the systems 200, 202, 204, 300, 400, and 500 for example, in communication with one or more devices, such as those illustrated in FIGS. 2-5. Method 950 may include one or more operations, functions, or actions as illustrated by one or more of blocks 952-956. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 952, the method 950 may involve providing for display on a user interface of the mobile device an invitation to connect the mobile device to the third media playback system. The invitation to connect to the mobile device to the third media playback system may be displayed in response to the mobile device receiving the third HHID.

At block 954, the method 950 may involve receiving at the user interface of the mobile device an input to connect the mobile device to the third media playback system. As discussed above, the user interface may include a touch screen that allows a user to interact through touch with the mobile device. In other embodiments, other input mechanisms such as voice control may be used to interact with the mobile device. In addition, if the mobile device connects to the third playback system, the mobile device may communicate with the third playback system in order to establish a geo-fence associated with the third playback system. For example, the mobile device may provide the third playback system with a set of coordinates reflecting the mobile device's current position, as well as a radius associated with the geo-fence. Alternatively, the third playback system may indicate that it is associated with an existing geo-fence, and provide those coordinates to the mobile device.

At block 956, the method 950 may involve establishing a connection between the mobile device and the third media playback system and registering the third media playback system to the mobile device. Once the connection is established, the mobile device may send one or more commands to the connected third media playback system for audio playback. As discussed above, the commands may include volume control, audio playback synchronization between one or more zone players, selection of a playlist or particular song, or other commands to provide overall control of the system configuration. The third media playback system may be added to the list of registered HHIDs in the data storage of the mobile device.

The controller software application may allow a threshold number of registered HHIDs to avoid maxing out memory. For example, the controller software application may support up to 100 HHIDs corresponding to 100 different media playback systems. After the threshold is met, the controller software application may be configured to remove the least recently used HHID from the memory of the mobile device.

IX. Illustrative Mobile Device Functionality

Figure 10A:
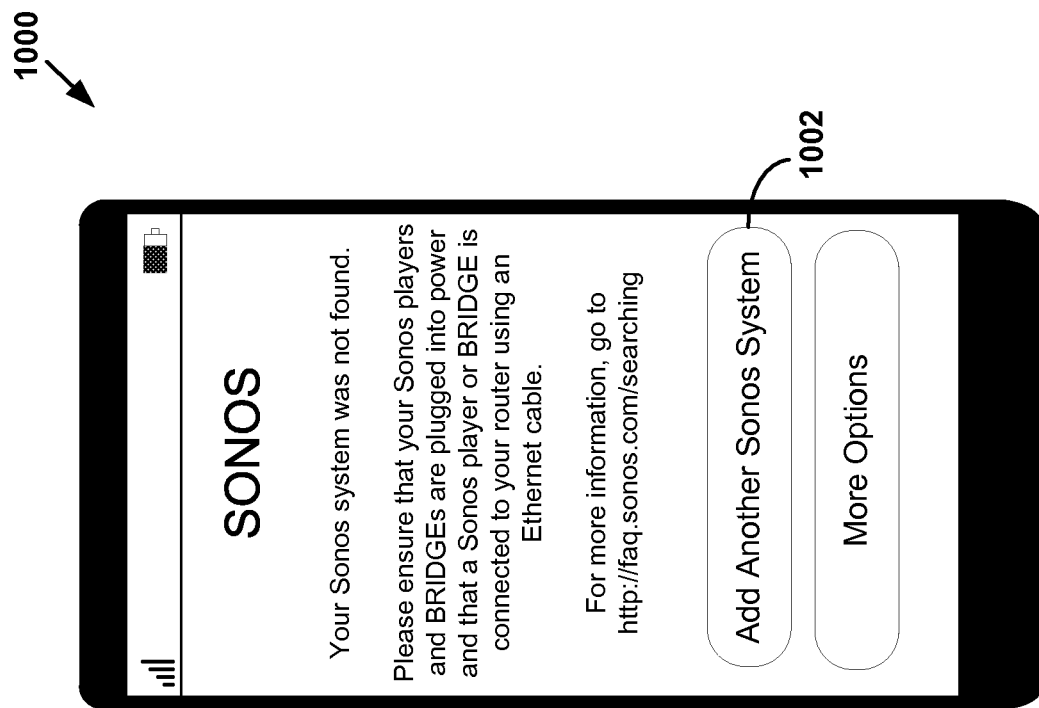
FIG. 10A shows an example user interface for establishing a connection between a mobile device and a media playback system.

FIG. 10A shows an example user interface for establishing a connection between a mobile device and a media playback system. As described above, the mobile device may send a multicast search message to search for an HHID corresponding to a media playback system. The mobile device may determine that it did not receive any of its registered HHIDs (e.g., the first HHID or the second HHID). In response, the mobile device may display an invitation to connect the mobile device to another media playback system.

FIG. 10A shows the example interface 1000 of the mobile device when the mobile device did not receive any of its registered HHIDs in response to sending a multicast search message (or listening for messages that include a HHID). The user may select the "Add Another Sonos System" icon 1002 to connect with another media playback system. The additional media playback system may be added to the list of registered HHIDs in the data storage of the mobile device.

Figure 10C:
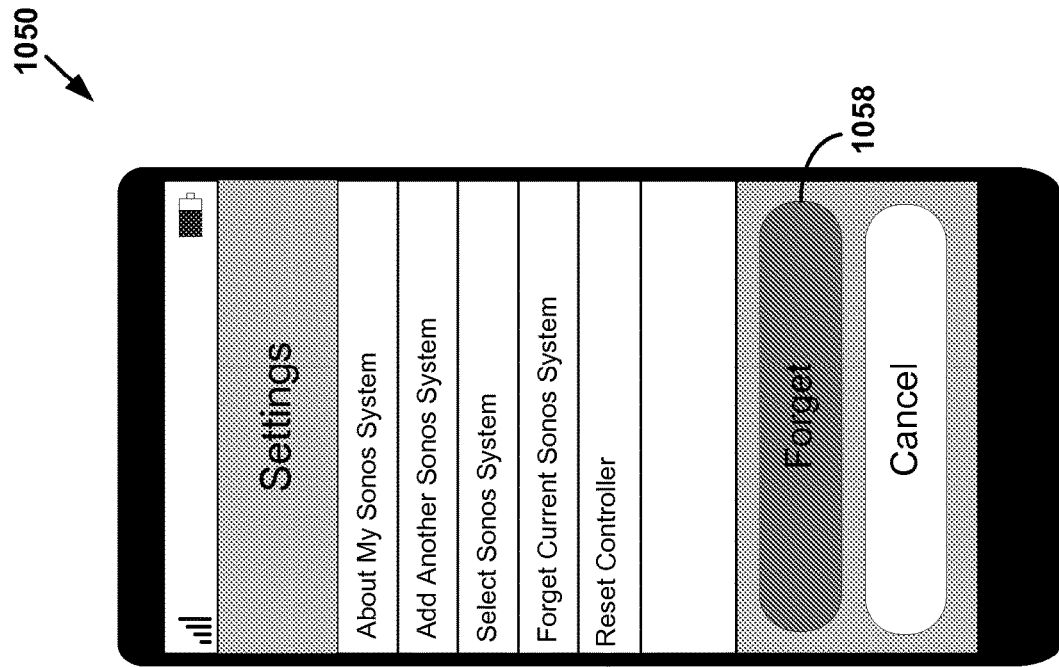
FIGS. 10B-10C show a series of example user interfaces.
Figure 10B:
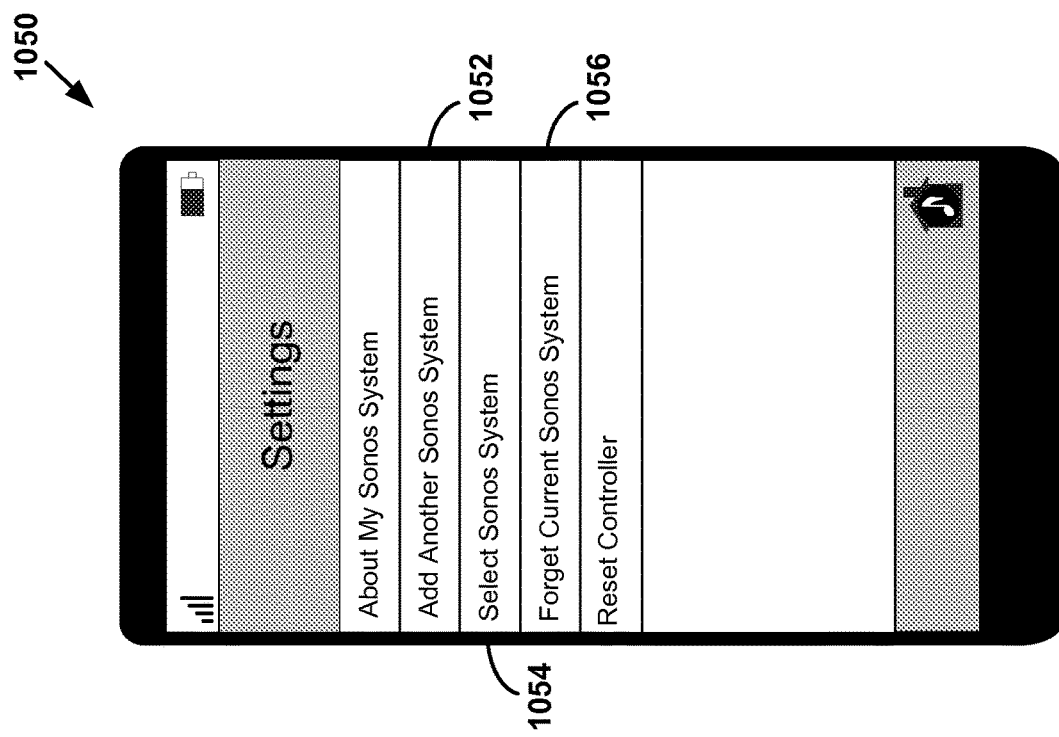

FIGS. 10B-10C show a series of example user interfaces. FIG. 10B shows an example settings interface 1050 of the mobile device when the mobile device receives multiple HHIDs in response to sending the multicast search message. Similar to the icon discussed above in relation to FIG. 10A, the user may select the "Add Another Sonos System" icon 1052 to connect with a media playback system that is not registered to the mobile device. If two registered HHIDs are received by the mobile device, the user may select the "Select Sonos System" icon 1054 to select the media playback system with which to connect.

Further, the user may select the "Forget Current Sonos System" icon 1056 to remove a media playback system from the list of registered systems. FIG. 10C shows an example settings interface 1050 of the mobile device when the user selects the "Forget Current Sonos System" icon 1056. The user may confirm his or her desire to remove a media playback system from the list of registered systems by selecting the "Forget" icon 1058. Other example methods, interactions and interfaces may also be possible.

X. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As indicated above, the present application involves enabling a user to control multiple media playback systems with a single mobile device. In one aspect, a method is provided. The method involves associating a mobile device to a first media playback system having a first HHID and associating the mobile device to a second media playback system having a second HHID. The method further involves connecting the mobile device to the first or second media playback systems based on receiving, by the mobile device, the first or second HHID, respectively. The method further involves using the mobile device to send one or more control commands to the connected first or second media playback system for audio playback. The method further involves not connecting the mobile device to a third media playback system based on receiving, by the mobile device, a third HHID.

In another aspect, a device is provided. The device includes a processor and computer readable medium having stored thereon instructions executable by the processor to perform function. The functions include associating a mobile device to a first media playback system having a first HHID and associating the mobile device to a second media playback system having a second HHID. The functions further include connecting the mobile device to the first or second media playback systems based on receiving, by the mobile device, the first or second HHID, respectively. The functions further include using the mobile device to send one or more control commands to the connected first or second media playback system for audio playback. The functions further include not connecting the mobile device to a third media playback system based on receiving, by the mobile device, a third HHID.

In yet another aspect, a non-transitory computer readable memory is provided. The non-transitory computer readable memory has stored thereon instructions executable by a computing device to cause the computing device to perform functions. The functions include associating a mobile device to a first media playback system having a first HHID and associating the mobile device to a second media playback system having a second HHID. The functions further include connecting the mobile device to the first or second media playback systems based on receiving, by the mobile device, the first or second HHID, respectively. The functions further include using the mobile device to send one or more control commands to the connected first or second media playback system for audio playback. The functions further include not connecting the mobile device to a third media playback system based on receiving, by the mobile device, a third HHID.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

The invention claimed is:

1. A computing system of at least one server, the computing system comprising:
   a network interface;
   at least one processor; and
   at least one non-transitory computer-readable medium comprising program instructions that are executable by the at least one processor such that the computing system is configured to:
      cause, via the network interface, display of a user interface comprising controls selectable to associate a media playback system with a first controller associated with at least one particular identifier;
      receive, via the network interface, data representing selection of a first media playback system comprising at least one first playback device connected to a first local area network at a first location;
      associate the first media playback system to the at least one particular identifier such that playback by the at least one first playback device is controllable via the first controller;
      receive, via the network interface, data representing selection of a second media playback system comprising at least one second playback device connected to a second local area network at a second location;
      associate the second media playback system to the at least one particular identifier such that playback by the at least one second playback device is controllable via the first controller; and
      associate a second controller to the at least one particular identifier such that playback by the at least one first playback device and playback by the at least one second playback device is controllable via the first controller and the second controller.

2. The computing system of claim 1, wherein the first controller is displayed on a graphical display of a first computing device, and wherein the program instructions that are executable by the at least one processor such that the computing system is configured to cause display of the user interface comprise program instructions that are executable by the at least one processor such that the computing system is configured to:
   send, via the network interface to the first computing device, state data representing one or more states of the first media playback system.

3. The computing system of claim 1, wherein the first controller comprises the user interface, and wherein the program instructions that are executable by the at least one processor such that the computing system is configured to cause display of the user interface comprise program instructions that are executable by the at least one processor such that the computing system is configured to:
   cause the first controller to display the user interface.

4. The computing system of claim 1, wherein the program instructions that are executable by the at least one processor such that the computing system is configured to associate the first media playback system to the at least one particular identifier comprise program instructions that are executable by the at least one processor such that the computing system is configured to:
   send, via the network interface to the first media playback system, instructions to configure the at least one first playback device with the at least one particular identifier.

5. The computing system of claim 1, wherein the at least one non-transitory computer-readable medium further comprises program instructions that are executable by the at least one processor such that the computing system is configured to:
   associate a third-party controller to the at least one particular identifier such that playback by the at least one first playback device and playback by the at least one second playback device is controllable via the first controller, the second controller, and the third-party controller.

6. The computing system of claim 5, wherein the third-party controller is configured to support a first wireless streaming protocol different from a second wireless streaming protocol supported by the first controller.

7. The computing system of claim 1, wherein the at least one non-transitory computer-readable medium further comprises program instructions that are executable by the at least one processor such that the computing system is configured to:
   receive, via the network interface, a command to play back particular audio content on one or more first playback devices of the first media playback system; and
   send, via the network interface to the first media playback system, instructions to cause the one or more first playback devices to play back the particular audio content.

8. The computing system of claim 7, wherein the one or more first playback devices comprise multiple first playback devices configured in a group, and wherein the program instructions that are executable by the at least one processor such that the computing system is configured to send the instructions to cause the one or more first playback devices to play back the particular audio content comprise program instructions that are executable by the at least one processor such that the computing system is configured to:
   send, via the network interface to the first media playback system, instructions to cause the multiple first playback devices to play back the particular audio content in synchrony.

9. The computing system of claim 1, wherein the at least one non-transitory computer-readable medium further comprises program instructions that are executable by the at least one processor such that the computing system is configured to:
   send, via the network interface to the first controller, state data comprising playback state of the at least one first playback device of the first media playback system, wherein after receiving the state data, the first controller displays metadata of audio content playing on the at least one first playback device.

10. At least one non-transitory computer-readable medium comprising program instructions that are executable by at least one processor of at least one server such that a computing system is configured to:
   cause, via a network interface, display of a user interface comprising controls selectable to associate a media playback system with a first controller associated with at least one particular identifier;
   receive, via the network interface, data representing selection of a first media playback system comprising at least one first playback device connected to a first local area network at a first location;
   associate the first media playback system to the at least one particular identifier such that playback by the at least one first playback device is controllable via the first controller;
   receive, via the network interface, data representing selection of a second media playback system comprising at least one second playback device connected to a second local area network at a second location;
   associate the second media playback system to the at least one particular identifier such that playback by the at least one second playback device is controllable via the first controller; and
   associate a second controller to the at least one particular identifier such that playback by the at least one first playback device and playback by the at least one second playback device is controllable via the first controller and the second controller.

11. The at least one non-transitory computer-readable medium of claim 10, wherein the first controller is displayed on a graphical display of a first computing device, and wherein the program instructions that are executable by the at least one processor such that the computing system is configured to cause display of the user interface comprise program instructions that are executable by the at least one processor such that the computing system is configured to:
   send, via the network interface to the first computing device, state data representing one or more states of the first media playback system.

12. The at least one non-transitory computer-readable medium of claim 10, wherein the first controller comprises the user interface, and wherein the program instructions that are executable by the at least one processor such that the computing system is configured to cause display of the user interface comprise program instructions that are executable by the at least one processor such that the computing system is configured to:
   cause the first controller to display the user interface.

13. The at least one non-transitory computer-readable medium of claim 10, wherein the program instructions that are executable by the at least one processor such that the computing system is configured to associate the first media playback system to the at least one particular identifier comprise program instructions that are executable by the at least one processor such that the computing system is configured to:
   send, via the network interface to the first media playback system, instructions to configure the at least one first playback device with the at least one particular identifier.

14. The at least one non-transitory computer-readable medium of claim 10, wherein the at least one non-transitory computer-readable medium further comprises program instructions that are executable by the at least one processor such that the computing system is configured to:
   associate a third-party controller to the at least one particular identifier such that playback by the at least one first playback device and playback by the at least one second playback device is controllable via the first controller, the second controller, and the third-party controller.

15. The at least one non-transitory computer-readable medium of claim 14, wherein the third-party controller is configured to support a first wireless streaming protocol different from a second wireless streaming protocol supported by the first controller.

16. The at least one non-transitory computer-readable medium of claim 10, wherein the at least one non-transitory computer-readable medium further comprises program instructions that are executable by the at least one processor such that the computing system is configured to:
   receive, via the network interface, a command to play back particular audio content on one or more first playback devices of the first media playback system; and
   send, via the network interface to the first media playback system, instructions to cause the one or more first playback devices to play back the particular audio content.

17. The at least one non-transitory computer-readable medium of claim 16, wherein the one or more first playback devices comprise multiple first playback devices configured in a group, and wherein the program instructions that are executable by the at least one processor such that the computing system is configured to send the instructions to cause the one or more first playback devices to play back the particular audio content comprise program instructions that are executable by the at least one processor such that the computing system is configured to:
   send, via the network interface to the first media playback system, instructions to cause the multiple first playback devices to play back the particular audio content in synchrony.

18. The at least one non-transitory computer-readable medium of claim 10, wherein the at least one non-transitory computer-readable medium further comprises program instructions that are executable by the at least one processor such that the computing system is configured to:
   send, via the network interface to the first controller, state data comprising playback state of the at least one first playback device of the first media playback system, wherein after receiving the state data, the first controller displays metadata of audio content playing on the at least one first playback device.

19. A method to be performed by at least one server of a computing system, the method comprising:
   causing, via a network interface, display of a user interface comprising controls selectable to associate a media playback system with a first controller associated with at least one particular identifier;

receiving, via the network interface, data representing selection of a first media playback system comprising at least one first playback device connected to a first local area network at a first location;

associating the first media playback system to the at least one particular identifier such that playback by the at least one first playback device is controllable via the first controller;

receiving, via the network interface, data representing selection of a second media playback system comprising at least one second playback device connected to a second local area network at a second location;

associating the second media playback system to the at least one particular identifier such that playback by the at least one second playback device is controllable via the first controller; and associating a second controller to the at least one particular identifier such that playback by the at least one first playback device and playback by the at least one second playback device is controllable via the first controller and the second controller.

20. The method of claim 19, further comprising:

sending, via the network interface to the first controller, state data comprising playback state of the at least one first playback device of the first media playback system, wherein after receiving the state data, the first controller displays metadata of audio content playing on the at least one first playback device.

\* \* \* \* \*